E. EGER.
BALE CUTTER.
APPLICATION FILED MAY 22, 1920.

1,405,401.

Patented Feb. 7, 1922.
2 SHEETS—SHEET 2.

INVENTOR.
Ernst Eger,
BY
Ernest Hopkinson
his ATTORNEY.

E. EGER.
BALE CUTTER.
APPLICATION FILED MAY 22, 1920.

1,405,401.

Patented Feb. 7, 1922.
2 SHEETS—SHEET 1.

INVENTOR.
Ernst Eger,
BY
Ernest Hopkinson
his ATTORNEY.

UNITED STATES PATENT OFFICE.

ERNST EGER, OF DETROIT, MICHIGAN, ASSIGNOR TO MORGAN & WRIGHT, A CORPORATION OF MICHIGAN.

BALE CUTTER.

1,405,401.

Specification of Letters Patent. Patented Feb. 7, 1922.

Application filed May 22, 1920. Serial No. 383,375.

*To all whom it may concern:*

Be it known that I, ERNST EGER, a citizen of the United States, residing at Detroit, in the county of Wayne and State of Michigan, have invented certain new and useful Improvements in Bale Cutters, of which the following is a full, clear, and exact description.

This invention relates to a cutter, and particularly to a type therefor suited for cutting rubber bales into a plurality of sections.

Heretofore bales have been cut by circular disks or endless steel bands similar to those employed in lumber mills. With these water is required as a lubricant to prevent burning the rubber and a plurality of operations are required to reduce the bales to the size sections desired.

The present invention aims to provide a cutter which in one operation will reduce a bale to sections of a suitable size and shape for introduction between mill rolls. It endeavors to dispense with the necessity of using water as a lubricant and subsequently getting rid of the moisture by drying. It aims to save time and expense by splitting the bale completely in a single operation. It further aims to provide an improved means for loading bales onto the cutter and simultaneously removing the sections of the previously split bale. And it contemplates a new method of breaking up a bale.

With the embodiment of the invention illustrated in mind, the invention may be briefly described as a segmental cutter depending from the upper platen of a press whose lower platen carries a stripping plate apertured to receive the blades of the cutter when the platens are brought towards one another, the blades entering the bale of rubber and splitting it into a plurality of wedge-shaped sections which the stripping plate prevents from being drawn back with the knife or cutter on its recession.

The invention is illustrated in the accompanying drawings in which—

Figure 4:
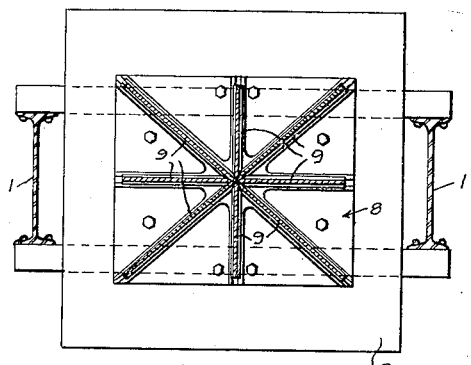
Figure 2:
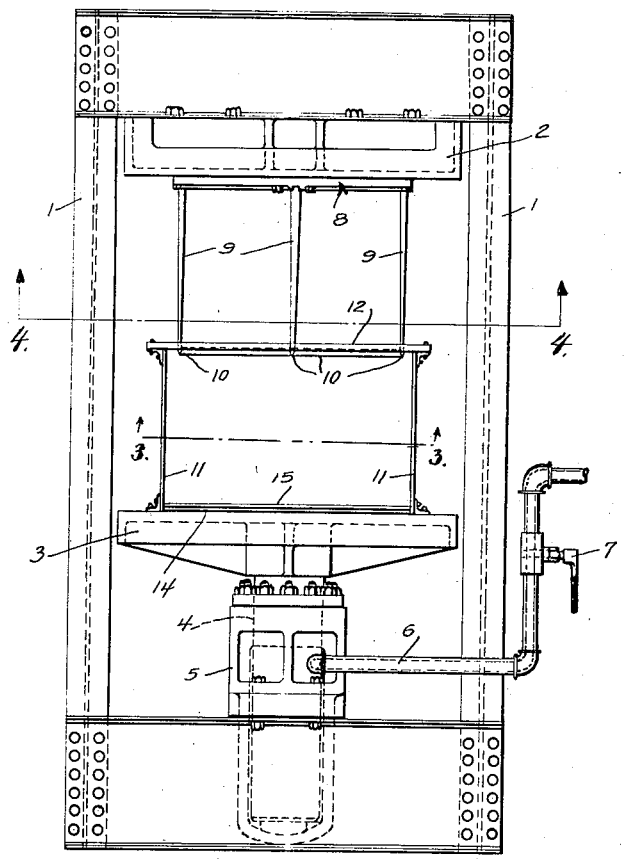
Fig. 2 is an elevation at right angles to that shown in Fig. 1.
Figure 3:
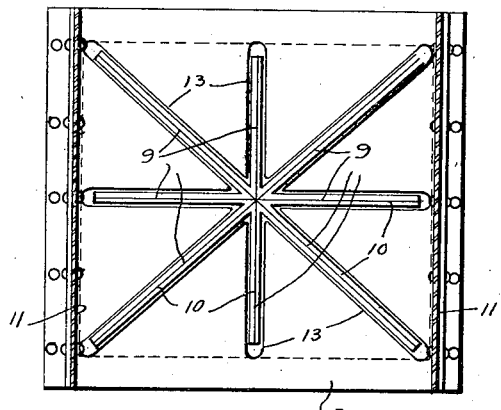
Figure 1:
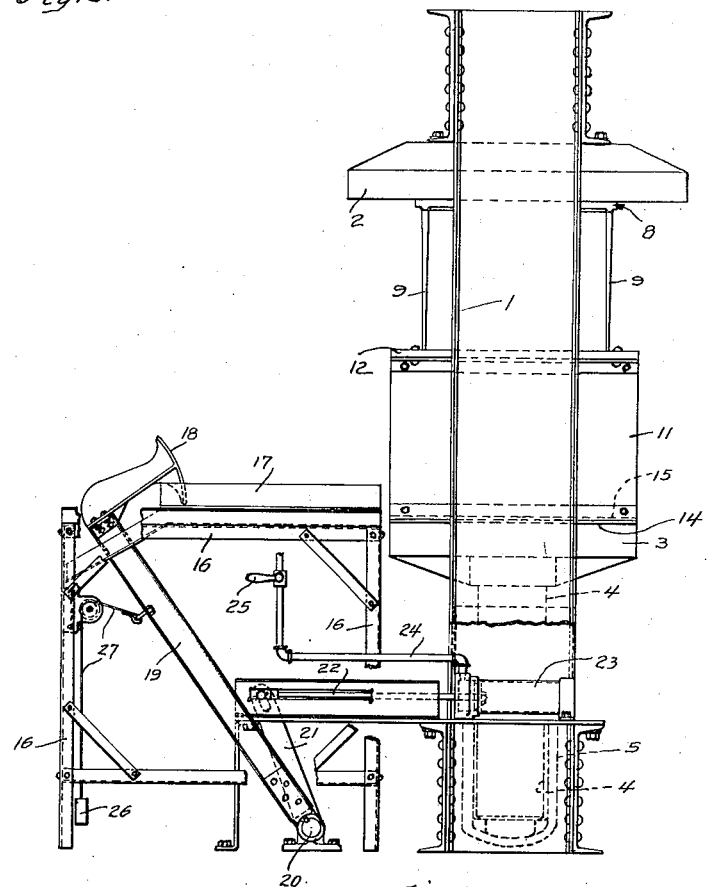
Fig. 1 is a side elevation of a press equipped with the cutter.

Figs. 3 and 4 are sections on the lines 3—3 and 4—4 respectively of Fig. 2.

While a wide variety of well known mechanical appliances may be used to produce a relative movement between the article to be cut and the cutter, the invention is preferably applied, as illustrated, to a press having a frame 1 to which an upper platen 2 is rigidly secured and within which a lower and movable platen 3 is mounted on a ram 4 reciprocable in a cylinder 5 that may be supplied with water or other suitable fluid under pressure by a pipe 6 with a valve 7 conveniently located therein.

A cutter indicated generally by the numeral 8 is rigidly secured in any suitable manner to the upper platen 2. The cutter 8 comprises a plurality of blades 9 at right angles to the underside of the platen 2 and arranged in converging and preferably intersecting planes as shown clearly in Figs. 3 and 4. The several blades terminate in cutting edges 10 in a plane substantially parallel to the upper surface of the lower platen 3.

To the lower platen 3 plates 11 are firmly secured upright and these plates carry a horizontal stripping plate 12 which is slotted as indicated at 13 to receive the several blades 9. On the platen 3 between the side plates 11 a cushion 14 of suitable resilient material such as vulcanized rubber, is positioned and on top of this is laid a plate 15 of ductile metal such as wrought iron or lead. The metal plate 15 is initially grooved to receive the cutting edges 10 of the several blades by bringing the platens together under sufficient pressure to form grooves of suitable depths, say $\frac{1}{16}$ of an inch. These grooves act as guides or bearings for the knife edges in the subsequent bale cutting operations. The cushion 14 permits limited play for slight inaccuracies of alignment between the grooves and cutting edges 10. When a bale of rubber is positioned between the plates 11 and the platens are brought together with the requisite pressure from 20 to 100 tons, varying with the size of the bales and total length of cut, the blades 9 pass through the stripping plate 12 and into the bale, splitting it into similar wedge-shaped sections corresponding to the space between the convergent blades 9 of the cutter. When the platens are separated the cutter is withdrawn and the sections into which the bale has been split are prevented from rising with it by the stripping plate 12.

Any suitable means may be used to position the rubber bales between the platens of the press, but the means illustrated are preferred. These comprise a frame 16 whose table portion 17 is disposed in alignment with the side plates 11. A bale of rubber positioned on the table 17 is shoved between the side plates 11 by the rounded face 18 of a lever 19 which is fixed to a fulcrum shaft 20 having a second arm 21 that is adapted to be operated by the piston rod 22 of a piston within a single acting pneumatic cylinder 23. The latter is supplied with air through a pipe 24 governed by a valve 25. Air supplied to the cylinder 23 through the valve 25 operates to advance the pusher face 18 against a bale of rubber and shove it between the side plates 11. The pusher may be returned by the counter weight 26 connected by a cable 27 to the lever 19 when the cylinder is exhausted.

The blades 9 constituting the cutter, are each of substantially rectangular form. In width, that is, vertically, they are substantially a fraction of their length, that is, horizontally. Relatively, their body portions are thin, and preferably slightly convergent. Their cutting edges 10 are defined by substantially inclined beveled surfaces, these being shown in the drawings at an angle of around 90°. The cutting edges of the several blades are preferably co-planar thereby adapting them to cooperate with the material support or lower platen 3 so as to sever the bale completely into sections without leaving a thin web or film of rubber to be subsequently broken by hand. While a plurality of the blades are shown, only one blade might be employed, but of course without realizing all the advantages of the invention.

From the foregoing description it will be seen that I have provided a new and novel type of cutter which will enable rubber bales to be split in a single operation into a plurality of the wedge-shaped sections that are adapted to be drawn readily between the rolls of a mixing mill. The bales may be introduced into a cutting position in the path of the cutter by the simple means illustrated or in any other suitable manner, the arrangement of the side plates 11 insuring removal of the previously cut sections of a bale when a non-cut bale is introduced.

As obviously many changes and constructions may be made without departing from the spirit of the invention, reference should be made to the accompanying claims for an understanding of its scope.

Having thus described my invention what I claim and desire to protect by Letters Patent is:

1. A rubber cutting machine having a cutting blade whose width is a substantial fraction of its length, a substantially flat material support free of walls confining the rubber against lateral spreading so as to restrict or prevent descent of the blade therethrough, and means for shifting the blade and support relative to one another whereby to sever the rubber.

2. A rubber cutting machine having a plurality of cutting blades inclined to each other and substantially perpendicular to a common plane, each of said blades being of a width a substantial fraction of its length, and a support for the rubber without substantial confining action on it laterally preventing spreading thereof during a cutting operation, and means for relatively shifting the blades and support whereby to cut up a bale of rubber into sections in one operation.

3. A rubber bale cutting machine having a plurality of substantially rectangular blades inclined to each other and having substantially a common line of intersection, each blade being of a width a substantial fraction of its length, said blades having cutting edges defined by substantially inclined beveled surfaces and having relatively thin body portions in rear of their beveled cutting edges, said cutting edges being in substantially the same plane, a substantially flat work support adapted to permit spreading of the rubber bales during a cutting operation, and means for moving the blades relative to the work support whereby to cut up a bale of rubber into a plurality of wedge-shaped sections in one operation.

Signed at Detroit, Michigan, this 15th day of May, 1920.

ERNST EGER.